United States Patent [19]
Arndt

[11] Patent Number: 5,913,577
[45] Date of Patent: Jun. 22, 1999

[54] PILOT STAGE OF AN ELECTROHYDRAULIC CONTROL VALVE

[75] Inventor: Robin S. Arndt, Joliet, Ill.

[73] Assignee: Caterpillar Inc., Peoria, Ill.

[21] Appl. No.: 08/762,357

[22] Filed: Dec. 9, 1996

[51] Int. Cl.⁶ .............................. B60T 8/38; E03B 31/00; F15B 13/02
[52] U.S. Cl. ................................. 303/117.1; 137/625.64; 91/52
[58] Field of Search .............................. 303/117.1, 119.2, 303/119.1; 137/625.61, 625.64, 624.15; 91/52

[56] References Cited

U.S. PATENT DOCUMENTS

| | | | |
|---|---|---|---|
| 4,774,976 | 10/1988 | Janecke et al. ............................ | 137/14 |
| 5,051,631 | 9/1991 | Anderson .................................. | 310/14 |
| 5,472,266 | 12/1995 | Volz et al. ............................. | 303/116.1 |
| 5,562,125 | 10/1996 | Bray .................................... | 137/625.64 |
| 5,588,463 | 12/1996 | Kervagoret .......................... | 137/596.15 |
| 5,611,370 | 3/1997 | Najmolhoda ....................... | 137/625.61 |
| 5,628,550 | 5/1997 | Zaviska et al. ...................... | 303/115.4 |
| 5,647,645 | 7/1997 | Muller et al. ........................ | 303/119.2 |
| 5,713,641 | 2/1998 | Hosoya ................................ | 303/117.1 |

Primary Examiner—Robert J. Oberleitner
Assistant Examiner—Melanie Talavera
Attorney, Agent, or Firm—John W. Grant; J. W. Burrows

[57] ABSTRACT

A pilot stage of an electrohydraulic control valve controls the position of a pilot actuated main stage by controlling fluid flow through a flow path that connects a supply port to an exhaust port and to an end of the main stage. A proportional valve of the pilot stage has a valve element for establishing a variable flow control orifice to control fluid flow through the flow path and a bleed orifice disposed in the flow path downstream of the proportional valve to generate fluid pressure upstream of the bleed orifice and at the end of the main stage.

8 Claims, 1 Drawing Sheet

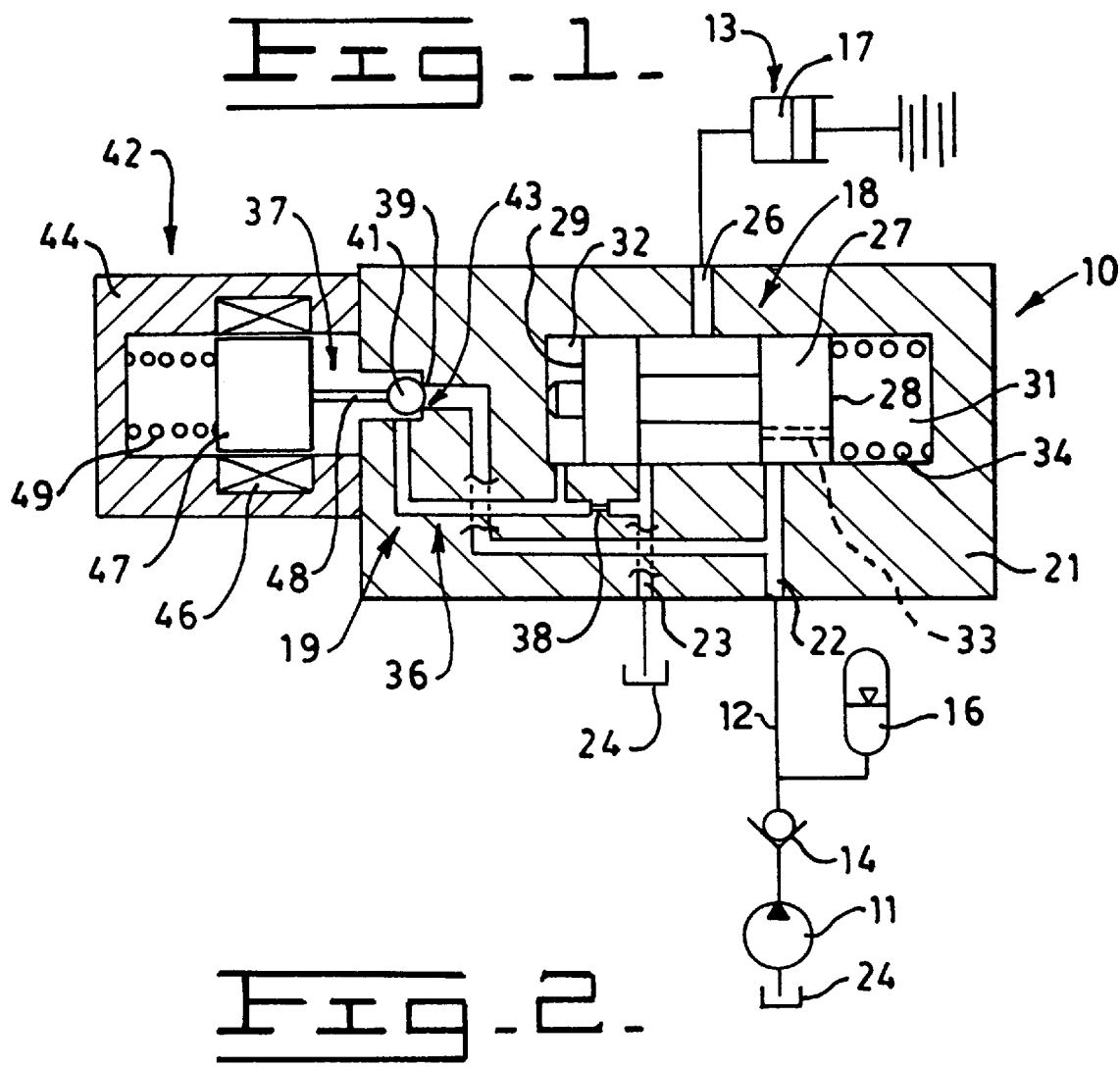
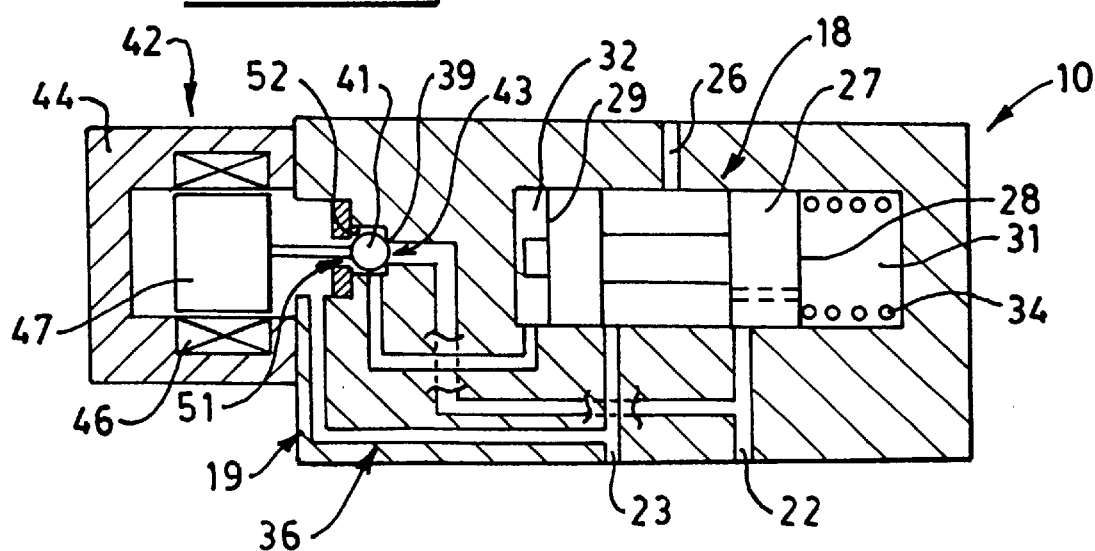

PILOT STAGE OF AN ELECTROHYDRAULIC CONTROL VALVE

TECHNICAL FIELD

This invention relates generally to a two stage electrohydraulic control valve and, more particularly, to such a control valve having a zero quiescent flow at its flow blocking position.

BACKGROUND ART

Two stage electrohydraulic pressure control valves are commonly used for actuating clutches or brakes where the output pressure is generally proportional to an electrical signal. Any of the current control valves have a pilot stage for providing a regulated pressure at a low flow rate for controlling a larger main stage that handles the main flow to and from the brakes or clutches. Some of the pilot stages function by controlling fluid flow through a bleed path from the main fluid supply to a tank to generate the regulated pressure at an end of the main stage valve spool. A continuous bleed flow exist even when the control valve in at its closed position. The bleed flow rate through the bleed path is generally very low and does not adversely affect the performance of the clutch or brake system. However, the continuous bleeding of fluid is detrimental to a braking or clutch system which uses an accumulator as a secondary or backup source since the accumulator is quickly depleted even when the control valves are not being actuated.

Thus, it would be beneficial to provide a two stage electrohydraulic control valve which has fluid flowing through a pilot stage flow path flow only when the control valve is actuated and flow through the flow path is positively blocked when the control valve is in its flow blocking position.

The present invention is directed to overcoming one or more of the problems set forth above.

DISCLOSURE OF THE INVENTION

In one aspect of the present invention, a pilot stage for controlling the position of a pilot actuated main stage of an electrohydraulic control valve includes a flow path connecting a supply port to an exhaust port and an end of the main stage, a proportional valve disposed to control fluid flow through the flow path, and a bleed orifice disposed in the flow path downstream of the proportional valve and between the end of the main stage and the exhaust port.

BRIEF DESCRIPTION OF THE DRAWINGS

FIG. 1 shows a cross sectional view of an embodiment of this invention in combination with a hydraulic system; and FIG. 2 is an alternate embodiment of the present invention.

BEST MODE FOR CARRYING OUT THE INVENTION

Referring to FIG. 1, a two stage electrohydraulic pressure control valve 10 receives hydraulic fluid from a pump 11 through a supply conduit 12 and directs a control pressure to an actuator 13. A check valve 14 is disposed in the conduit. An accumulator 16 is connected to the supply conduit downstream of the check valve. The actuator in this embodiment is a pressure applied clutch having an actuator chamber 17. Alternatively, the actuator could be a spring applied pressure released brake.

The control valve 10 includes a pilot actuated main stage 18 and a solenoid actuated pilot stage 19 disposed within a common housing 21 having a supply port 22 connected to the supply conduit 12, an exhaust port 23 connected to a tank 24 and a control port 26 connected to the actuator chamber 17. The main stage 18 handles the main control flow from the pump/accumulator to the actuator and includes a valve spool 27 slidably disposed in the housing. The valve spool has opposite ends 28,29 defining a feedback chamber 31 and a control chamber 32 respectively, and defines a passage 33 which continuously communicates the feedback chamber 31 with the control port 26. A spring 34 disposed within the feedback chamber 31 resiliently biases the valve spool to the position shown blocking the supply port 22 from the control port 26 and communicates the control port 26 with the exhaust port 23.

The pilot stage 19 includes a flow path 36 connecting the supply port 22 to the exhaust port 23. A proportional valve 37 and a fixed size bleed orifice 38 are serially disposed in the flow path 36 with the bleed orifice 38 being downstream of the proportional valve. The control chamber 32 is connected to the flow path between the proportional valve and the bleed orifice 38.

The proportional valve 37 is preferably an anti or low leak valve and includes an annular valve seat 39 disposed between the supply port 22 and the flow path 36, a valve element 41 such as a ball, and a proportional solenoid 42 disposed to bias the ball into sealing engagement with the valve seat 39. The proportional valve is movable to an open operating position to establish a variable flow control orifice 43 between the supply port 22 and the flow path 36. Alternatively, the valve element can be a conical poppet.

The proportional solenoid 42 includes a casing 44 secured to the housing 21, an annular coil 46 disposed within the casing 44, and an armature 47 movably disposed within the coil in the usual manner and having a plunger 48 extending toward the ball 41. In this embodiment, a spring 49 is disposed between the casing 44 and the armature 47 to bias the ball 41 into sealing engagement with the valve seat 39.

During normal operation, the proportional solenoid 42 is de-energized so that the spring 49 holds the ball 41 in sealing engagement with the valve seat 39 to close the variable control orifice 43 and is controllably energized to progressively open the variable control orifice 43 when an electrical signal is input thereto. Thus, fluid pressure in the control chamber 32 is essentially zero when the variable control orifice 43 is closed and increases as the variable control orifice is progressively opened. The proportional valve 42 is thus referred to as a pressure increasing valve since the pressure in the control chamber 32 is essentially zero when the coil 46 is de-energized and increases proportional to the increase in the electrical signal input to the coil 46.

FIG. 2 discloses an alternate embodiment of the electrohydraulic pressure control valve with the same reference numerals of the first embodiment used to designate similarly constructed counterpart elements of this embodiment. In this embodiment, however, the fixed size bleed orifice 38 disclosed in FIG. 1 is replaced with a variable bleed orifice 51 and the proportional solenoid 42 does not have a spring resiliently biasing the ball 41 into sealing engagement with the valve seat 39.

The variable bleed orifice 51 is defined by the ball 41 and another valve seat 52 positioned so that the ball moves toward the valve seat 52 as it moves away from the valve seat 39 and vice versa. This causes fluid flow through the variable control orifice 43 to increase and fluid flow through the variable bleed orifice 51 to decrease as the ball moves leftward. Conversely, rightward movement of the ball causes fluid flow through the variable bleed orifice 51 to increase and fluid flow through the variable control orifice 43 to decrease as the ball moves rightward.

During normal operation of this embodiment, the proportional solenoid 42 is fully energized to hold the ball in sealing engagement with the valve seat 39 to close the variable control orifice 43 and is controllably de-energized by decreasing the electrical signal to progressively open the variable control orifice 43 and progressively close the variable bleed orifice 51. The fluid pressure in the control chamber 32 is essentially zero when the variable control orifice 43 is closed and increases as the variable control orifice 43 progressively opens and the variable bleed orifice 51 progressively closes. Thus, the proportional valve is commonly referred to as a pressure decreasing valve since the pressure in the control chamber since the pressure in the control chamber 32 is essentially zero when the coil 46 is fully energized and decreases proportional to decreasing the electrical signal input to the coil.

Alternatively, the embodiment of FIG. 1 can be converted to a pressure decreasing valve by removing the spring 49 and the embodiment of FIG. 2 can be converted to a pressure increasing valve by adding the spring 49 between the armature 47 and the case 44.

Industrial Applicability

In operation, the pilot stage 19 provides a regulated pressure at lower flow for displacing the larger main stage 18 so that the control pressure in the control port 26 is essentially proportional to the electrical signal input to the proportional solenoid 42 of the pilot stage.

The pilot and main stages 19,18 in FIG. 1 are shown in a clutch disengaged position wherein the variable control orifice 43 is closed and the chamber 32 communicates with the exhaust port 23 via the bleed orifice 38. Engaging the clutch from this condition is initiated by energizing the proportional solenoid 42 of the proportional valve 37 with an electrical signal to move the armature 47 leftward against the bias of the spring 49 and establish the variable control orifice 43. This controls fluid flow through the flow path 36 to control the fluid pressure in the control chamber 32. More specifically, when the effective area of the variable control orifice 43 becomes larger than the area of the bleed orifice 38, a fluid pressure is generated in flow path 36 upstream of the bleed orifice and hence in the control chamber 32 with the fluid pressure being controlled by controlling the size of the variable control orifice 43. The increasing pressure in the control chamber 32 moves the valve spool 27 rightward to initially block the control port 26 from the exhaust port 23 and subsequently communicate the supply port 22 with the control port 26 to direct pressurized fluid from the pump and/or accumulator 16 to the actuating chamber 17.

Disengagement of the clutch is accomplished by de-energizing the pilot stage allowing the spring 49 to move the ball 41 to its flow blocking position. This causes the fluid pressure in the control chamber 32 to decrease, thereby allowing the valve spool 27 to be moved back to its original position by the spring 34.

The operation of the embodiment of FIG. 2 is essentially identical to that of FIG. 1 with the exception that the fluid pressure in the control chamber 32 is increased by decreasing the electrical signal input to the proportional solenoid 42. Decreasing the electrical signal de-energizes the coil 46 allowing the ball 41 to be moved away from the valve seat 39 to establish the fluid flow through the flow path 36. Once the effective size of the variable control orifice 43 becomes greater than the effective size of the variable bleed orifice 51, a pressure differential is generated by the variable bleed orifice causing the pressure upstream of the variable bleed orifice and hence in the control chamber 32 to increase.

In view of the above, it is readily apparent that the structure of the present invention provides an improved pilot stage for controlling the main stage of a electrohydraulic pressure control valve by placing the bleed orifice downstream of the proportional valve so that flow through the flow path occurs only after the proportional valve has been opened. This thereby eliminates the parasitic loss normally occurring when the bleed orifice is disposed between the supply port and the proportional valve. In this embodiment, the proportional valve includes an anti-leak valve element to further prevent the loss of fluid through the bleed path at the closed position of the proportional valve.

Other aspects, objects and advantages of this invention can be obtained from a study of the drawings, the disclosure and the appended claims.

I claim:

1. A pilot stage of an electrohydraulic control valve for controlling the position of a pilot actuated main stage comprising;

a supply port;

an exhaust port;

a flow path connecting the supply port with the exhaust port and to an end of the main stage;

a proportional valve disposed in the flow path to control fluid flow therethrough, the proportional valve includes an annular valve seat disposed in the flow path, an anti-leak valve element operative to engage the annular valve seat, and a proportional solenoid disposed to selectively control the position of the anti-leak valve element relative to the annular valve seat against the force of the flow from the supply port; and a bleed orifice disposed in the flow path downstream of the proportional valve and between the end of the main stage and the exhaust port.

2. The pilot stage of claim 1 wherein the proportional valve controls movement of the anti-leak valve element to establish a variable flow control orifice.

3. The pilot stage of claim 2 wherein the valve element is a ball and the proportional solenoid includes a plunger that is spring biased into engagement with the ball and proportionally movable in the opposite direction in response to an electrical signal.

4. The pilot stage of claim 2 wherein the proportional valve is a pressure increasing valve in which the proportional solenoid includes a plunger and a spring disposed to resiliently bias the valve element into positive sealing engagement with the valve seat when the solenoid is de-energized.

5. The pilot stage of claim 1 wherein the proportional valve is a pressure decreasing valve including a plunger disposed to move the valve element to the closed position when the solenoid is fully energized.

6. The pilot stage of claim 1 wherein the bleed orifice is a fixed size orifice.

7. The pilot stage of claim 1 wherein the bleed orifice is a variable bleed orifice controlled by movement of the valve element away from the valve seat.

8. The pilot stage of claim 6 wherein the variable bleed orifice includes another valve seat disposed between the valve element and the exhaust port.

* * * * *